United States Patent
Hippelainen (10) Patent No.: US 6,738,369 B1
(45) Date of Patent: May 18, 2004

(54) METHOD AND ARRANGEMENT FOR PACKET-SWITCHED DATA TRANSMISSION

(75) Inventor: Leo Hippelainen, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/367,743

(22) PCT Filed: Oct. 25, 1999

(86) PCT No.: PCT/FI98/00996

§ 371 (c)(1),
(2), (4) Date: Aug. 19, 1999

(87) PCT Pub. No.: WO99/33230

PCT Pub. Date: Jul. 1, 1999

(30) Foreign Application Priority Data

Dec. 19, 1997 (FI) .................................................. 974580

(51) Int. Cl.[7] ............................. H04L 12/56; H04B 7/00
(52) U.S. Cl. .................. 370/349; 370/347; 370/389; 370/498
(58) Field of Search ................................ 370/277, 280, 370/284, 313, 314, 315, 322, 326, 347, 349, 352, 389, 464, 465, 471, 472, 474, 475, 476, 498

(56) References Cited

U.S. PATENT DOCUMENTS

| | | | | |
|---|---|---|---|---|
| 4,491,945 A | * | 1/1985 | Turner | 370/409 |
| 4,817,085 A | * | 3/1989 | De Prycker | 370/252 |
| 5,020,055 A | | 5/1991 | May, Jr. | |
| 5,251,215 A | * | 10/1993 | Dravida et al. | 370/471 |
| 5,511,072 A | * | 4/1996 | Delprat | 370/336 |
| 5,615,210 A | | 3/1997 | Kaiyama et al. | |
| 5,793,756 A | * | 8/1998 | Ayerst et al. | 370/311 |
| 5,844,918 A | * | 12/1998 | Kato | 714/751 |
| 6,064,678 A | * | 5/2000 | Sindhushayana et al. | 370/470 |
| 6,178,470 B1 | * | 1/2001 | Dowling | 710/52 |

FOREIGN PATENT DOCUMENTS

WO 96/38963 12/1996

* cited by examiner

*Primary Examiner*—Hassan Kizou
*Assistant Examiner*—Ahmed Elallam
(74) *Attorney, Agent, or Firm*—Pillsbury Winthrop LLP (57) ABSTRACT

The invention relates to a method for transmitting data in a telecommunication system that comprises at least one packet-switched transmission network, in which data is transmitted in data packets of a standard length, the number of such standard lengths being determined in advance. To transfer information in as compact form as possible, a unique length code (L) is maintained for each standard length, and to each packet is added a length code (L) corresponding to the header of the packet to be transferred to indicate the length (3) of the packet. The invention further relates to a telecommunication system in which the method of the invention can be utilized.

12 Claims, 3 Drawing Sheets

| Headerbytes | Bit7 | Bit6 | Bit5 | Bit4 | Bit3 | Bit2 | Bit1 | Bit0 |
|---|---|---|---|---|---|---|---|---|
| 1.byte | 1 | C/S | A | | | | | |
| 2.byte | A | | | | | | | |
| 3.byte | PR | | | | N | | L | |
| 4.byte | CRC | | | | | | | |

METHOD AND ARRANGEMENT FOR PACKET-SWITCHED DATA TRANSMISSION

BACKGROUND OF INVENTION

The invention relates to packet-switched data transmission and particularly to packet-switched data transmission in a telecommunication network of a digital mobile telephone system when data is transmitted at various rates over the air interface of the mobile telephone system.

In most digital mobile telephone systems the carrier wave of the radio path is divided between several users by using, for example, a TDMA (Time Division Multiple Access) or CDMA (Code Division Multiple Access) method. The common feature of the methods is that a call is encoded as sequences of a certain length into blocks to be transferred in frames on the radio path. The blocks comprise channel coding information of a standard length, a payload, and error correction information, whose length is determined by the error correction level used. Particularly for data calls, various error correction levels are defined. The length of the payload to be transferred in a block on the ratio path is thus dependent on the error correction level used in the call and varies from call to call. Usually only the payload of a block is transferred in the transmission network, the payload being characterized in that the payloads of one and the same call are equal in length, but the payloads of two different calls can be different in length. A similar situation can also be encountered in other telecommunication systems in which a protocol transferring information over an interface uses payloads of different lengths. The following is a description of the problems involved in the prior art. Particular attention is paid to mobile systems, but the invention is not to be restricted to them.

Packet-switched transmission networks are often based either on ATM technology (Asynchronous Transfer Mode) or HDLC protocol (High-level Data Link Control).

Figure 1A:
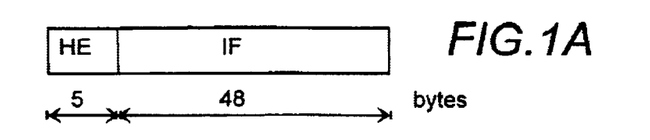
FIG. 1A shows the basic structure of an ATM cell.

In the asynchronous mode ATM information is transferred in standard-length 53-byte ATM cells according to FIG. 1A: in each cell 5 bytes form the Header HE of the cell and the remaining 48 bytes contain the actual Information Field IF. The fields of the cell are transmitted from left to right. To simplify, the user information to be transferred is cut in the ATM technology to sequences of a standard length, and each sequence is positioned in the information field IF of the ATM cell. If the amount of user information is less than 48 bytes, padding bits are transmitted in the ATM cell. The problem in the ATM technology is that the payload transferred on the radio path does usually not measure 48 bytes, i.e. 384 bits, wherefore padding bits are needed and the transmission capacity is underused. In addition, if the payload in a block on the radio path is longer than 48 bytes, the content of one block must be transmitted in several ATM cells. This may impair the quality of a connection in a loaded network, and the transmission capacity may be underused when a radio packet is late for its transmission slot because, for example, due to the load the last ATM cell belonging to the block arrives too late at the network node to be transmitted onto the radio path. All the bits belonging to the block must have arrived before the block to be transmitted onto the radio path can be encoded.

Another problem in the ATM technology is that the addition of padding bits and/or division of the payload between a plural number of cells adds to the processing of the information to be transferred when the transmission network is entered or exited.

The use of one standard-length cell or packet which is based on the ATM technology and the length of whose information field has been defined to equal the length of the payload transmitted on the radio path makes it possible to reduce the use of padding bits. It remains to be a problem, however, that when the length of the payload to be transmitted on the radio path is different, padding bits must still be used and/or the payload must be divided between a plural number of packets.

Figure 1B:
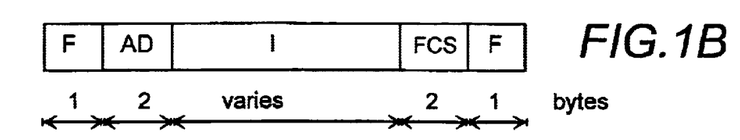
FIG. 1B shows the basic structure of a Frame Relay frame.

A packet transmission mechanism based on the High Level Data Link Control protocol HDLC applicable to synchronized transmission is Frame Relay FR, which is used, for example, in the General Packet Radio Service GPRS. The GPRS is one of the items being standardized in phase 2+ of the Pan-European GSM system (Global System for Mobile Communications) in the ETSI (European Telecommunications Standards Institute). FIG. 1B shows the basic structure of an FR frame according to the HDLC protocol without any start/end bits (for asynchronous links) or bits or octets positioned in the frame on account of transparency. The frame comprises five fields. The fields of the frame are transmitted in order from left to right. The frame begins and ends with a 1-octet-long Flag F, which is a predetermined bit sequence that starts and ends with a '0' bit and contains six '1' bits in between. The flag starting the frame is followed by an Address field AD and then by an Information field I. The information field I is not of a fixed length, but it contains an integer number of octets of transferable information and padding bits. The information field is followed by a 2-octet Frame Check Sequence FCS.

The HDLC, and thereby the FR, contains a so-called bit stuffing protocol. The occurrence of certain bit patterns, such as the content reserved for the flag, in the information field is prevented by the addition of padding bits. The padding bits, however, pose problems in the transmission network. In some mechanisms based on the HDLC, the payload transferred is always of a certain length, whereby the length of the frame is bound to the information content to be transferred. In a network employing the FR technology the parties participating in the transfer can negotiate the length of the frame to be used before the transfer. If the length of the frame and thereby the length of the information field are constant, the length of the payload transferred in the frame varies with the information content to be transferred. For example, the payload of the first of two successive blocks of one and the same call transmitted on the radio path can fit into one frame, whereas the payload of the second block may have to be divided between a plural number of frames, although the payloads on the radio path are equal in length. If the length of the frame has been determined to be such that no division is necessary, padding bits must be used, the number of padding bits varying from one frame to another, completely depending on the information content to be transferred.

The problem in the HDLC and thereby in the FR technology is the processing need caused by the padding bits when the network is entered or exited, and the wasted transmission capacity. In addition, the variation in the frame length causes variation in the transfer times. Likewise, the variation in the length of the payload transferred in the frame causes variation in the transfer times of the payload. If the transfer times vary too much, the quality of the call will be impaired. In real-time speech transmission in particular, it is important that the transfer times are as constant as possible for the duration of the entire speech item. Further, variation in the transfer times of data call packets is also disadvantageous in mobile telephone systems, since the blocks must be transmitted onto the radio path at a constant rate in accordance with the radio path protocol, irrespective of their content.

BRIEF DESCRIPTION OF INVENTION

The object of the present invention is to provide a method and a telecommunication system by which the above problems can be overcome and the efficiency of the transmission capacity of a packet-switched transmission network can be maximized and the payload processing required by the transmission network can be minimized. The object is achieved with a method of the invention used for data transmission in a telecommunication system that comprises at least one packet-switched transmission network in which information is transferred in information packets of a standard length, the number of said standard lengths having been determined in advance. The method of the invention is characterized by maintaining a unique length code for each standard length, and adding the length code indicating the length of the packet to the header of the packet to be transferred.

The invention also relates to a system in which the method of the invention can be used. The system is a telecommunication system utilizing wireless data transmission, the system comprising a packet-switched transmission network for transmitting information in standard-length data packets, the number of the standard lengths having been determined in advance, and the transmission network comprising at least a first node for transmitting data packets to the transmission network and a second node for receiving data packets from the transmission network, said first node comprising reception means for receiving information arriving at the transmission network, modifying means for assembling data packets, and transmission means for transmitting the data packets to the transmission network, and said second node comprising at least reception means for receiving data packets. The system is characterized in that the modification means are arranged to provide the data packet with a header, the header comprising at least a length code consisting of a bit sequence to indicate the standard length used in the packet, and the reception means of the second node being arranged to detect the length of the data packet received from the length code contained in the header of the packet.

The invention is based on the idea that the length of the packets can be indicated by a short bit sequence when packets of a standard-length are used, the lengths of the packets being predetermined.

The advantage of the method and arrangement according to the invention is that packets of different lengths can be transmitted in the transmission network without any padding bits, using a short header. There is thus little redundancy in the information to be transferred. Two different packet lengths can be indicated by a 1-bit length code, four by a 2-bit code, eight by a 3-bit code, etc., irrespective of the actual length of the packet. When the packet lengths to be used are selected suitably, no padding bits need to be used.

In a preferred embodiment of the invention, as many packet lengths are defined as there are net data transmission rates over the air interface. The advantage is that a unique packet length can be defined for each payload transferred over the air interface, and with the help of these packet lengths the use of the transmission network can be optimized.

In another preferred embodiment of the invention, the packet lengths are defined such that the payload transferred in them is equal to the payload transferred over the air interface. The advantage is that the payload transferred over the air interface can be positioned in a packet without adding any padding bits and without dividing the payload, for example, into two smaller packets. This shortens the transfer times and enhances the utilization of the transfer capacity.

In a preferred embodiment of the invention, error correction information is added to the packet in accordance with the error correction level to be used over the air interface. The error correction here means that an error is detected and optionally corrected in accordance with the error correction protocol used in the embodiment. The advantage is that the checking and correction of the transmission errors of the transmission network correspond to the error correction of the air interface, which is notably more susceptible to errors. If information is transferred over the air interface without error correction, it can also be transferred in the transmission network without error correction.

In another preferred embodiment of the invention, header check data is added to the header of the information packet, and the forwarding of a packet received is started in a transmitting network node once the header has been checked. The advantage, is that the forwarding of the packet can be started before it has been received in its entirety, and so the transfer time of the packet can be shortened. The checking of the correctness of the header ensures that the packet is transmitted to the correct address. This enhances the degree of use of transmission network capacity, since packets with an erroneous address will not be forwarded.

In a preferred embodiment of the invention the data packets containing user information are separated from the control packets on the basis of a bit in the header, and a piece of information indicating the length of the packet is added to the control packet. The advantage is that data and control packets can be transmitted on the same transmission connection, and that the lengths of the control packets may vary and that the signalling information need not be adjusted in accordance with the lengths of the data packets. Usually, control packets are transmitted seldom, and they are short. In the present embodiment, no padding bits need to be used. In addition, the embodiment allows the transmission of even very long control packets in the transmission network, for example, when the network is being updated.

The preferred embodiments of the method and arrangement according to the invention appear from the attached dependent claims 2 to 6 and 8 to 12.

LIST OF FIGURES

In the following the invention will be described in greater detail by means of preferred embodiments and with reference to the attached drawings, in which.

DETAILED DESCRIPTION OF INVENTION

In the following the invention will be described by way of an example, assuming the telecommunication system to be a digital radio system according to the TETRA standard (Trans-European Trunked Radio or Terrestrial Trunked Radio) defined by the ETSI (European Telecommunications Standards Institute). The TETRA standard provides standards, for example, for interfaces to other networks, for an air interface and for an interface to another TETRA network. The TETRA standard, however, does not provide any standard for the internal structure of a transmission network, so the network can be well used as an example. The invention, however, is not limited to radio systems or other wireless systems, but it will be obvious to those skilled in the art how the invention can be applied in other telecommunication systems both in networks based on wireless data transmission and in fixed networks.

Figure 2:
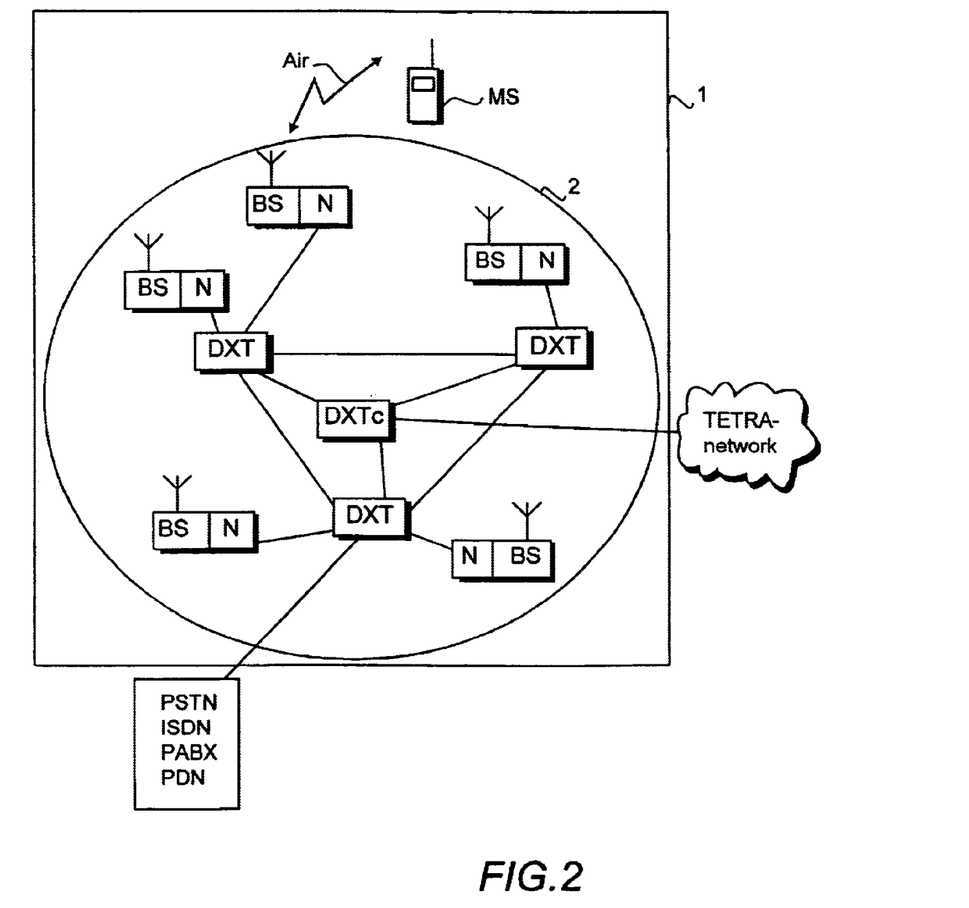
FIG. 2 is a block diagram of a TETRA telecommunication system.

FIG. 2 shows an example of the structure of a TETRA system 1. A Mobile Station MS is connected with a transmission network 2 via a Base Station BS over the radio path Air. The radio interface is defined in the TETRA standard. Each base station BS comprises a Node N which is connected by a circuit to a Digital Exchange DXT for TETRA of the fixed transmission network. The TETRA exchanges DXT are connected to other exchanges DXT and to a Digital Central Exchange DXTc for TETRA by a fixed circuit, the DXTc being an exchange to which are connected other exchanges DXT and/or other central exchanges DXTc so as to provide alternative paths for the traffic. The interface to another TETRA network is here arranged in the central exchange DXTc, but it can also be located in the other exchanges DXT. The external interfaces, defined by the standard, to the Public Switched Telephone Network PSTN, the Integrated Services Digital Network ISDN, the Private Automatic Branch Exchange PABX and the Packet Data Network PDN are here located in one exchange DXT, but they can also be arranged, for example, in every exchange. All the nodes N, DXT and DXTc of the transmission network 2 can thus both transmit data packets to the transmission network 2 and to receive packets from the transmission network 2. The operation of the nodes will be described in greater detail in connection with FIG. 6, in which the exchange DXT serves as an example for a node. The TETRA transmission network also comprises other interfaces and peripherals, which are not shown in the figure. They include, for example, network management systems and dispatcher systems.

Figure 3:
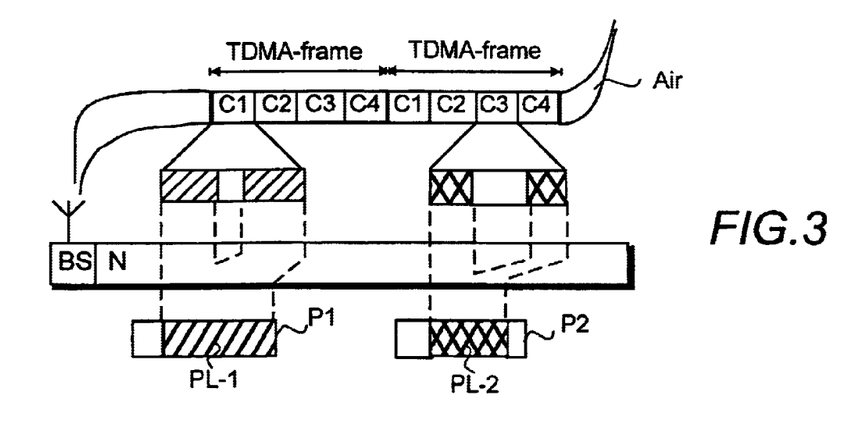
FIG. 3 illustrates the relation between the packets on the radio path and the packets transmitted in the transmission network.

FIG. 3 illustrates the relation between the blocks on the radio path and the packets transmitted in the transmission network. When data is transmitted on the radio path, frames are transmitted in succession on a carrier wave. One frame comprises carrier-wave-specific channels or connections and thereby a block belonging to a call destined to a receiving mobile station on the channel. As the TETRA system or the like considers a call as separate speech items, a call here means a speech item. Correspondingly, a base station receives successive frames, in which a channel is allocated for each connection. In accordance with the current carrier wave multiplexing methods, the frames are either TDMA or CDMA frames. The duration of the frame transmission depends on the radio system used. In a system that follows the TETRA standard, for example, the transmission of one TDMA frame takes about 60 ms, and in narrowband data transmission implemented by a CDMA method the transmission of a frame takes about 20 ms.

FIG. 3 shows channels C1, C2, C3 and C4 transmitting on a carrier wave in a first preferred embodiment of the invention in accordance with the TETRA standard. The radio interface Air according to the TETRA standard is based on a 4-channel time division multiplexed carrier wave whose bandwidth is 25 kHz. In the TETRA standard the channel is called a time slot. In this description, however, the term 'channel' will be used in the same sense. For the sake of clarity, the figure shows only one carrier wave and only in one direction. A base station can also have several carrier waves, and there are carrier waves in both the uplink and the downlink directions. One channel is usually allocated for each call, but a TETRA radio system also allows the allocation of several channels for one call. For the sake of clarity, however, it is here assumed that one channel is allocated for one call. In FIG. 3, it is assumed that unprotected data is transmitted on channel C1, whereby the data transmission rate is 7200 bit/s and the actual information content of the block,; i.e. the payload PL-1, is 432 bits, i.e. 54 bytes. Protected data is transmitted on channel C3, whereby the data transmission rate is 4800 bit/s and the payload PL-2 of the block is 288 bits, i.e. 36 bytes. The payload PL-1, PL-2 of the block received from the radio path is separated from other data transferred on the radio path in the node N at the base station, and the payload is formed into a packet P1, P2 in the manner described in connection with FIG. 4. Correspondingly, the payload PL-1, PL-2 is separated from the packets received from the transmission network in the node N, any other necessary information is added thereto on the radio path, and the block is forwarded in the correct time slot to a mobile station. FIG. 3 does not show the accurate, detailed structure of the block, nor the actual location of the information, but it only describes the information content of the block, making the basic idea of the invention apparent. The hatched section in FIG. 3 indicates the payload transmitted over the radio path, and the black section indicates other data transmitted on the same channel over the radio path, such as channel coding. In practice the hatched section and a certain part of the black section are mixed in a block transmitted over the air interface.

In addition to the packets allocated for data transmission in FIG. 3, the TETRA standard defines well-protected data whose data transmission rate on the air interface is 2400 bit/s, whereby the actual payload of the block is 144 bits, i.e. 18 bytes. In addition to data transmission, the TETRA standard defines two ways of transferring speech. Speech is usually transferred by transmitting it as channel-coded speech, whereby the payload of one block is 274 bits, i.e. 34.25 bytes. Speech can also be transferred without channel coding, whereby the payload of one block is 432 bits, i.e. 54 bytes. The speech that has not been channel-coded and the unprotected data thus use exactly the same payload.

The above data transmission rates are net data transmission rates, and the corresponding payloads are net payloads. This means that, for example, an 864-bit information block might be packed into 432 bits by a data packing program, whereby the gross payload is 864 bits (and the gross data transmission rate is 14 400 bit/s), but the load transferred, i.e. the net payload, is 432 bits at a net data transmission rate of 7 200 bit/s. The data transmission rate can also be increased by allocating more than one channel for one connection. The net transmission rate, however, means the rate used on one channel, and the payload corresponding to the net data transmission rate means the amount of information transferred in one frame on one channel.

Figure 4:
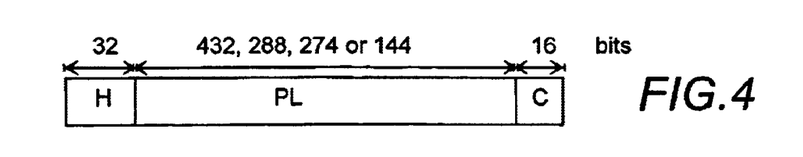
FIG. 4 shows a frame of the invention.

FIG. 4 shows the structure of a data transmission packet according to the invention in a first preferred embodiment in which the TETRA standard is employed. The packet comprises a payload PL, whose length in the first preferred embodiment is determined on the basis of the data transmission rate. The length is thus either 432, 288, 274 or 144 bits (i.e. the length in bytes is 54, 36, 34.25 or 18). The invention, however, is not limited to these lengths, and for example a 432-bit payload could be divided into two and transmitted in 288 and 144-bit packets or, correspondingly, a 274-bit payload could be transmitted in a packet meant for 288 bits. The essential feature of the invention is that information is transferred in packets of a standard length, and that there are at least two such standard lengths. When a unique length of a transmission packet is defined for each data transmission rate, i.e. each payload of a block on the radio path, the advantage achieved is that the packets are easier to process and the operation of the network can be better optimized.

With reference to FIG. 4, a header H is added to the payload, the length of the header in the first preferred embodiment being a standard 4 bytes, i.e. 32 bits. The structure of the header is described in greater detail in connection with FIG. 5. A unique header length could also be defined for each payload length, e.g. a 24-bit header could be added to a 432-bit payload, a 32-bit header to a 288-bit payload, a 46-bit header to a 274-bit payload, and a 40-bit header to a 18-byte payload. The advantage in the use of a single standard-length header is that the packets are easier to process in the network nodes. The advantage in the use of unique header lengths, on the other hand, is that the lengths of the packets can be adjusted, which adds to the diversity in the optimization of the network and reduces the number of packet lengths to be transferred.

To detect data transmission errors, the packet shown in FIG. 4 is provided with a suffix C. In the first preferred embodiment, the suffix C is not added to those packets whose payload is 432 bits. This payload is transferred unprotected/without channel coding, i.e. without an error check, over an air interface, which is notably more susceptible to error. When this data transmission rate is used, the correctness of the data transmission is not very significant. The advantage of a packet without a suffix is that the total length of the packet to be transmitted is slightly shorter, the packet can be outputted slightly more quickly, and the packet can be received more quickly, since the packet need not be checked for transmission errors. In the first preferred embodiment of the suffix is added to those packets whose payload is either 288, 274 or 144 bits. The suffix C in the first preferred embodiment is the same for all three payloads, being, for example, a 16-bit Cyclic Redundancy Check CRC. In the first preferred embodiment, call packets P of a length of either 464, 336, 322 or 192 bits are inputted or transferred into or outputted from the actual transmission network. In the other embodiments of the invention the suffix need not be used, or the suffix can be the same in all packets, or a unique suffix can be defined for each packet length. The suffix can also enable error correction, being, for example, a Forward Error Correction FEC. The essential point in the packet of the invention is that its length is always one of the predetermined standard lengths, and that it comprises at least a header of a predetermined length and a payload of a predetermined length.

Figure 5:
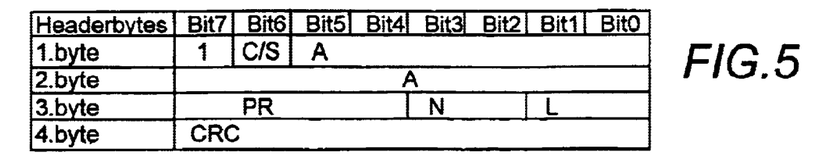
FIG. 5 illustrates the content of the header of a frame according to the invention.

The structure of the header in the first preferred embodiment is shown in FIG. 5. The header always begins with a '1' bit, which indicates the beginning of a message packet. Even when no packets are transmitted on the transmission channel, it is possible to send bytes (octets) thereon in which the first bit is '0'. In other embodiments a larger number of bits or different bit patterns can be used as the initial sequence in a message packet, or the header can be started with a '0' bit.

In the first preferred embodiment the next bit is C/S, which indicates the packet type, i.e. whether the packet is a control packet containing signalling information or whether it is a call or data packet.

The next 14 bits A indicate the address of the packet. The address can be the address of the target node or a logical address, depending on whether the packet is a control packet or a data packet. Some of the addresses are allocated as general addresses in the first preferred embodiment; such general addresses are used for example to distribute any changes in the routing tables to the network nodes.

The TETRA standard defines several different speech and data services that have different priorities. The priority determines how the packet is treated in the event of congestion. In the first preferred embodiment, the four bits PR following the address A in the header of the packet indicate the priority.

The next two bits N of the header are used to number the packets consecutively so that a missing packet can be detected. The bits N can also be used to indicate the number of the time slot, or channel, that the packet belongs to. The bits N can also be used to transmit other information that may be needed by the network nodes so as to maximize efficient use of the capacity.

The bits N are followed by a two-bit bit sequence L, which is the length code of the packet. In the first preferred embodiment of the invention length code 00 means that the total length of the packet is 464 bits, code 01 stands for a total length of 336 bits, code 10 for a total length of 322 bits, and code 11 for a total length of 192 bits. The packet length can thus be indicated by two bits. If the packet length were indicated without a length code using actual numbers, the length 464, for example, would have to be multiplied by a 9-bit sequence instead of a 2-bit sequence used in the present invention. Although the lengths are indicated as bytes, a longer length sequence is needed: 464 bits are 58 bytes, and at least a 6-bit sequence is needed to indicate number 58.

In the first preferred embodiment, the length code sequence L is followed by the last part of the header: an 8-bit cyclic redundancy check sum CRC to detect any transmission errors in the header. The advantage in the use of the cyclic redundancy check sum is that any transmission errors in the header are detected and a packet addressed to an erroneous address will not be forwarded.

If in the embodiment of the invention is employed a header by which the data packets and the control packets can be distinguished, length code 00 can represent, for example, a 464-bit data packet, or a 2048-bit (256-byte) control packet. On the basis of the C/S bit of the header the network node knows which length is in question. Naturally, an alternative in which length code 00 always represents a packet of a certain length, for example, a 464-bit packet, is also possible. In the embodiments where the header makes use of the C/S bit, the control packets can also vary in length, whereby, for example, the first octet of the content, i.e. the payload, indicates the length of the control packet, preferably in bytes. The space reserved for the length code and the check sum of the header can also be used for this in embodiments where the control packets are received in full before they are forwarded. The control packet then ends, for example, with a 2-byte check sum, and before the packet is forwarded, it is checked whether the whole control packet has transferred correctly.

In some embodiments of the invention, it is possible to use any 'extra' length codes of the data packet to indicate that the packet transfers standard-length signalling information. There remain extra length codes when the number of payloads in data packets is not in the power of two. This might be the case, for example, in a TETRA system intended only for data transmission, in which the number of payload lengths is three. Extra length code 10 might indicate, for example, a packet containing 64-bit signalling information, regardless of whether the C/S bit is used or what the value of the bit is.

The structure of the header in FIG. 5 is shown by way of an example: not all the elements of the header shown in FIG. 5 are needed in all the embodiments. In the header according to the invention, it is sufficient that there is a bit sequence L, which contains the length code of the packet, at a certain point of the header of the data packet. The length of the bit sequence L in bits preferably depends on how many payload lengths have been defined. All the above numerical values are presented by way of an example, and they are only intended to illustrate the invention without limiting it in any way.

Figure 6:
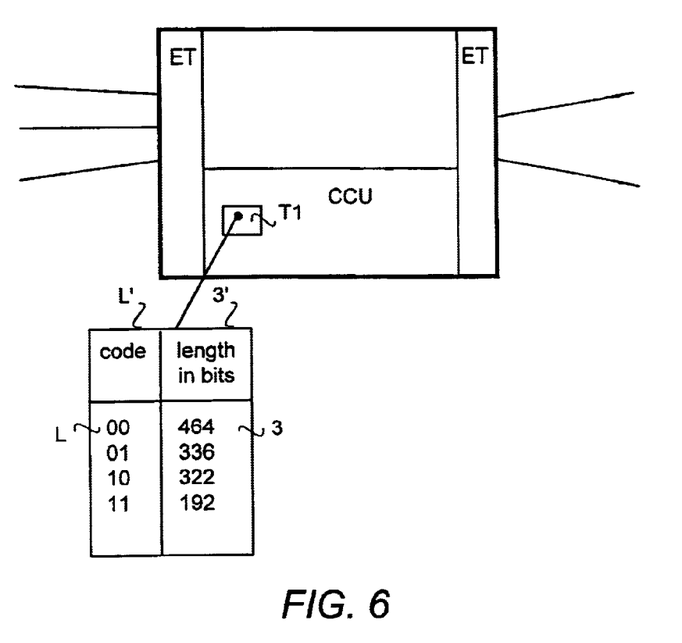
FIG. 6 is a block diagram of a network node.

FIG. 6 is a block diagram illustrating a network node of the invention in the first preferred embodiment. The network node is, for example, a TETRA exchange DXT, to which there lead three input channels and from which there lead two output channels in accordance with FIG. 6. The only restriction of the number of output and input channels in the network node of the invention is that the network node comprises at least one input channel. The network node DXT comprises exchange terminals ET for transmitting and receiving packets.

The network node also comprises a call control unit CCU, whose functions are call control and resource management. The call control unit CCU controls the transmission and reception of packets via the exchange terminals ET. The call control unit CCU identifies the information in the header of the packet received. In the first preferred embodiment, the call control unit CCU detects on the basis of the C/S bit whether it is receiving a data or a control packet. The call control unit checks the length of the data packet received on the basis of the length code found in the header of the packet, and knows from the code whether the whole packet has been received. To convert a length code to an actual length, the call control unit CCU can, for example, maintain a conversion table t1, which comprises a code column L' and a length column 3' indicating the actual length 3 corresponding to the code L. Table t1 may also contain other columns. For example, if packets whose lengths are full bytes are to be transferred in a TETRA transmission network, the conversion table t1 may contain a column 'length in bytes ' in addition to the columns mentioned above. For channel-coded speech and for protected data, for example, it is then possible to use packets containing an equal number of bytes; where channel-coded speech is concerned, the remainder is filled with padding bits. The information found in the table indicates it to the call control unit CCU where the padding bits begin and when the whole packet has been received. There are also other ways of converting the length code L to the actual length 3.

In the first preferred embodiment the exchange terminals ET also receive packets from and transmit packets to other networks. On the basis of the input channel the call control unit CCU knows whether it is receiving a packet that has to be formed into a transmission network packet according to FIG. 4 or whether it is receiving a complete packet from the transmission network. If the packet is received from the transmission network, the call control unit CCU checks whether the header of the data packet received from the transmission network has transferred correctly: it computes the check sum of the header and compares it with the check sum contained in the header. If the sums are identical, the header has transferred correctly and the call control unit CCU starts to examine the address in the header of the packet in order to forward the packet. The call control unit CCU routes the packet using conventional routing methods, such as routing tables. If a packet received from the transmission network is returned to the transmission network, the call control unit CCU can send the exchange terminal ET a command to start the transmission of the packet toward the correct address, although the packet has not yet been received in its entirety. If a previous packet is being sent onto the same output channel, the packet will have to wait for a while. However, it is forwarded substantially immediately, i.e. the transmission is started immediately as the previous packet has been transmitted in its entirety. The advantage is that the transmission time of the packet is thus as short as possible.

If in the first preferred embodiment the call control unit CCU detects from the address of the packet received from the transmission network that the packet is not to be forwarded to another node in the network, it unloads the payload from the packet and, using conventional conversion protocols, either forms the payload into a packet/packets according to the interface protocol or converts it to circuit-switched form and subsequently forwards it. If the received packet contains, for example, a check sum for error checking, the call control unit checks whether the packet has transferred correctly. Since in the first preferred embodiment the transmission errors of the packet are not checked in the transmission network but only during the exit from the transmission network, the speech will not be fragmented, as would be the case if a packet were missing. In addition, the transmission is speeded when a check is not carried out in every node. The application used determines how an incorrectly transferred packet is processed: it can be transmitted in the incorrect form, deleted, replaced with a padding packet, or retransmission may be requested.

If the header of the packet received from the transmission network has transferred incorrectly, the call control unit CCU will not forward the packet, nor carry out any packet conversions.

If the packet received is not obtained from the transmission network but is a packet that needs to be converted, the call control unit CCU forms the packet into a packet that can be transferred in the transmission network, as described in connection with FIG. 4, by separating the payload, adding in front of the payload a header with correct information, described in connection with FIG. 5, and optionally adding after the payload a check sum.

In the first preferred embodiment the data packets are separated from the control packets on the basis of the C/S bit of the header described in connection with FIG. 5. When forming a transmission packet, the network node DXT sets the C/S bit either to the data packet value or to the control value, depending on the type of information concerned. When receiving a transmission network packet, the network node knows on the basis of the C/S bit which type the packet is. In the first preferred embodiment the network node is arranged to receive and transmit signalling packets of a varying length, in which the structure of the header differs from the header of the data packet. In the exchange DXT, for example, the call control unit CCU detects a control packet and the length of the packet from the first byte of the payload.

In other embodiments of the invention, the network nodes do not necessarily have all the above elements, or alternatively their functions can be more diverse. The essential point in the system of the invention is that it comprises at least two network nodes: one can at least receive a packet and detect the actual length of the packet from the length code contained in the packet, and the other can at least add a header containing a length code to the packet and forward the packet.

It is to be understood that the above description and the accompanying drawings are only intended to illustrate the present invention. It will be obvious to those skilled in the art that the invention can be varied and modified in many ways without deviating from the scope and spirit of the invention as disclosed in the attached claims.

What is claimed is:

1. A method for data transmission in a telecommunication system having at least one packet-switched transmission network in which data is transferred in data packets of a standard length, the number of such standard lengths being predetermined, the method comprising:

maintaining a unique code for each standard length, the unique code indirectly indicating the standard length, the length of the code depending on the number of the standard lengths and being the same for each code irrespective of the corresponding standard length; and adding the code corresponding to the data packet length to a header of the data packet to be transferred so as to indirectly indicate a length of the data packet transferred.

2. A method as claimed in claim 1 wherein the telecommunication system further comprises at least one air interface, over which at least two different net data transmission rates are defined, the method further comprising maintaining as many standard lengths as there are net data transmission rates.

3. A method as claimed in claim 1, wherein a net data transmission rate is issued to determine the length of the payload transferred over an air interface, the method further comprising determining the length of the payload, a length of a standard-length header and a length of error check data of the data packet as the standard length.

4. A method as claimed in claim 3, wherein the length of the error check data of the data packet depends on an error correction level of the payload to be transferred over the air interface.

5. A method as claimed in claim 1, further comprising when a data packet is being assembled, adding check data for checking the correctness of the header to the header; and substantially immediately after the correctness of the header has been checked, forwarding of the data packet received in the network.

6. A method as claimed in claim 1, wherein said telecommunication system is a TETRA system, and the code comprises a 2-bit-long sequence.

7. A telecommunication system utilizing wireless data transmission, the system comprising a packet-switched transmission network for transmitting data in data packets of a standard length, the number of the standard lengths being predetermined, wherein said transmission network comprises at least a first node for transmitting data packets to the transmission network and a second node for receiving data packets from the transmission network, said first node comprising reception means for receiving data that arrives at the transmission network, conversion means for assembling data packets, and transmission means for transmitting data packets to the transmission network, and said second node comprising at least reception means for receiving data packets, wherein the conversion means are arranged to provide the data packet with a header, which contains at least a code consisting of a bit sequence to indirectly indicate the standard length used in the packet, the length of the code depending on the number of the standard lengths and being the same irrespective of the standard length, and the reception means of the second node are arranged to detect the length of the data packet received on the basis of the code contained in the header of the packet.

8. A telecommunication system as claimed in claim 7, the system further comprising at least one base station for transmitting packets over the air interface, wherein the conversion means are arranged to provide the data packet with a payload transferred over the air interface and to select a length of the packet to be transmitted and the corresponding code on the basis of the length of the payload from a predetermined number of standard lengths, the number of such standard lengths being equal to the number of the lengths of the payloads to be transmitted over the air interface.

9. A telecommunication system as claimed in claim 7 wherein the conversion means are also arranged to provide the data packet with data packet error check data.

10. A telecommunication system as claimed in claim 7, wherein the conversion means of the first node are arranged to provide the header with check data to check the correctness of the header; and the second node further comprises transmission means for transmitting data packets to the transmission network and a transmission controller for checking the correctness of the header in response to a correct header, for sending the transmission means a command to transmit the data packet.

11. A telecommunication system as claimed in claim 7, wherein the reception means of the first node are arranged to separate signaling from data, and the conversion means are arranged to provide the headers of the packets to be transferred with a flag bit indicating whether the packet is a data packet or a signaling packet, and wherein the conversion means are arranged to provide a signaling packet with information indicating the length of the packet.

12. A telecommunication system as claimed in claim 7, wherein the data transmission system is a TETRA system, the transmission network is a transmission network internal to the TETRA system, and the code comprises a 2-bit-long sequence.

* * * * *

UNITED STATES PATENT AND TRADEMARK OFFICE
CERTIFICATE OF CORRECTION

PATENT NO. : 6,738,369 B1
DATED : May 18, 2004
INVENTOR(S) : Hippeläinen It is certified that error appears in the above-identified patent and that said Letters Patent is hereby corrected as shown below:

<u>Title page,</u>
Item [75], Inventor, should read:
-- Leo T. Hippeläinen, Helsinki (FI) --
Item [22], PCT Filed, should read:
-- December 18, 1998 --

Signed and Sealed this

Twenty-fourth Day of August, 2004

JON W. DUDAS
*Director of the United States Patent and Trademark Office*